US012752364B2

(12) United States Patent
Kusano

(10) Patent No.: US 12,752,364 B2
(45) Date of Patent: Oct. 6, 2026

(54) COOLANT DROP PREVENTION SYSTEM

(71) Applicant: KYOKUTOH CO., LTD., Aichi (JP)

(72) Inventor: Hirokazu Kusano, Aichi (JP)

(73) Assignee: KYOKUTOH CO., LTD., Aichi (JP)

( * ) Notice: Subject to any disclaimer, the term of this patent is extended or adjusted under 35 U.S.C. 154(b) by 622 days.

(21) Appl. No.: 18/222,965

(22) Filed: Jul. 17, 2023

(65) Prior Publication Data

US 2023/0356319 A1 Nov. 9, 2023

Related U.S. Application Data

(63) Continuation of application No. PCT/JP2021/046828, filed on Dec. 17, 2021.

(30) Foreign Application Priority Data

Jan. 20, 2021 (JP) ................................ 2021-007179

(51) Int. Cl.
*B23K 11/30* (2006.01)

(52) U.S. Cl.
CPC ................................ *B23K 11/3018* (2013.01)

(58) Field of Classification Search
CPC ..... B23K 11/36; B23K 11/115; B23K 11/315; B23K 11/314; B23K 11/3018; B23K 11/3054; B23K 11/3072; B23K 2101/006
See application file for complete search history.

(56) References Cited

U.S. PATENT DOCUMENTS 10,307,857 B2 6/2019 Nicewonger
12,186,823 B2 * 1/2025 Nicewonger ...... B23K 11/3072
2016/0067815 A1 3/2016 Nicewonger
2021/0162529 A1 * 6/2021 Lim ...................... B23K 11/115

FOREIGN PATENT DOCUMENTS

CN 104475958 A 4/2015
CN 205129167 U 4/2016
CN 110114183 A 8/2019
DE 3316868 A1 5/1984
DE 10101787 B4 1/2005
DE 202017107534 U1 4/2019

(Continued)

OTHER PUBLICATIONS

Office Action issued in Japanese Patent Application No. 2021-007179 mailed on Aug. 6, 2024, with English Translation (6 pages).

(Continued)

*Primary Examiner* — Brian W Jennison
(74) *Attorney, Agent, or Firm* — Nakanishi IP Associates, LLC

(57) ABSTRACT

In a coolant drop prevention system (1), a first pipe (4) has a first end connected to a portion of a coolant supply pipe (15) closer to a welding gun (11) than a first stop valve (2). A second pipe (5) has a first end connected to a portion of a coolant discharge pipe (16) closer to the welding gun (11) than a second stop valve (3). A drain pipe (6) has a first end connected to a portion of the coolant discharge pipe (16) farther from the welding gun (11) than the second stop valve (3). A pump unit (7) sucks in coolant from the first pipe (4) and the second pipe (5) and discharges the sucked coolant into the drain pipe (6).

1 Claim, 2 Drawing Sheets

(56) References Cited

FOREIGN PATENT DOCUMENTS

| | | | |
|---|---|---|---|
| JP | H2-118684 | U | 9/1990 |
| JP | 2008-183578 | A | 8/2008 |
| JP | 2010-069493 | A | 4/2010 |
| JP | 2017-52835 | A | 9/2017 |
| JP | 2017-528325 | A | 9/2017 |
| KR | 101423201 | B1 | 7/2014 |
| KR | 101514219 | B1 | 4/2015 |
| KR | 20160032873 | A | 3/2016 |
| KR | 10-1856154 | B1 | 5/2018 |
| WO | 2016/040514 | A1 | 3/2016 |
| WO | 2018/124647 | A1 | 7/2018 |
| WO | 2020/087959 | A1 | 5/2020 |

OTHER PUBLICATIONS

Office Action issued in Chinese Patent Application No. 202180090514.9 dated Jul. 30, 2025. (16 pages).
Extended European Search Report issued in European Patent Application No. 21921305.5, dated Jun. 3, 2024 (7 pages).
Office Action issued in Canadian Patent Application No. 3203516 mailed on Dec. 20, 2024. (5 pages).
Office Action issued in Korean Patent Application No. 10-2023-7023195 mailed on Jan. 8, 2025, with English Translation (10 pages).
Office Action issued in Indian Patent Application No. 202317052609 dated Jun. 12, 2026. (6 pages).
International Search Report (ISR) issued in PCT/JP2021/046828 mailed on Feb. 15, 2022 with English Translation (5 pages).
Written Opinion of International Searching Authority issued (WOSA) in PCT/JP2021/046828 mailed on Feb. 15, 2022 with English Translation (5 pages).

* cited by examiner

COOLANT DROP PREVENTION SYSTEM

BACKGROUND OF INVENTION

Field of the Invention

The present invention relates to a coolant drop prevention system. When electrodes at the tip of a welding gun in a spot welder are removed for replacement, the coolant drop prevention system prevents coolant for the electrodes from dropping from the tip of the welding gun.

Background Art

A welding gun in a spot welder includes electrodes at the tip. The electrodes are replaced after use for a predetermined period. The replacement involves closing a stop valve on a coolant passage to stop the circulation of the coolant, removing the used electrodes from the tip of the welding gun, and attaching new electrodes to the tip of the welding gun. After the used electrodes are removed, a portion of the coolant remaining in the coolant passage may drop through the openings at the tip of the welding gun. The dropping coolant may wet, for example, the operator's body and other equipment.

In response to this, a coolant drop prevention device described in Patent Literature 1 includes, for example, a cylindrical body and a pair of fluid pressure cylinders. The cylindrical body has an opening at one end and a guide hole at the center of the other end. The opening is connected to the coolant passage. The pair of fluid pressure cylinders is arranged in parallel in the direction perpendicular to the centerline of the cylindrical body. The cylindrical body encloses a partition dividing its internal space into a space closer to the coolant passage and a space closer to the guide hole, and a guide rod slidably fitted through the guide hole. The guide rod has one end connected to the partition and the other end coupled to a piston rod in each fluid pressure cylinder with a joining bracket. After the electrodes are removed from the tip of the welding gun, a stop valve on the coolant passage is operated to stop the circulation of the coolant circulated by a cooling unit. The piston rod in each fluid pressure cylinder is then extended to create a negative pressure in the space closer to the coolant passage inside the cylindrical body. The coolant is sucked from the coolant passage into the space closer to the coolant passage and does not drop from the openings at the tip of the welding gun.

CITATION LIST

Patent Literature

Patent Literature 1: WO 2020/087959

SUMMARY OF INVENTION

Technical Problem

The coolant drop prevention device described in Patent Literature 1 cannot suck the coolant in a volume exceeding a predetermined volume into the space inside the cylindrical body. When used with, for example, a larger welding gun, the coolant drop prevention device may fail to suck, into the cylindrical body, all the coolant in the portion of the coolant passage closer to the welding gun than the stop valve. In that case, the coolant may drop from the tip of the welding gun.

In response to the above, one or more aspects of the present invention are directed to a coolant drop prevention system for spot welders that reliably prevents the coolant from dropping from the tip of the welding gun during replacement of the electrodes, independently of the size or the type of the equipment.

Solution to Problem

In response to the above, the system according to one or more aspects of the present invention allows replacement of the electrodes when the coolant is repeatedly sucked from the coolant passage using a pump unit.

More specifically, a coolant drop prevention system for preventing, when electrodes are removed from a tip of a welding gun in a spot welder, coolant circulated into the electrodes through a coolant supply passage and a coolant discharge passage from dropping from the tip of the welding gun has the structure described below.

A coolant drop prevention system according to a first aspect of the present invention includes a first stop valve at an intermediate position along the coolant supply passage to stop supply of the coolant into the electrodes, a second stop valve at an intermediate position along the coolant discharge passage to stop discharge of the coolant from the electrodes, a first pipe having a first end connected to a portion of the coolant supply passage closer to the welding gun than the first stop valve, a second pipe having a first end connected to a portion of the coolant discharge passage closer to the welding gun than the second stop valve, a drain pipe having a first end connected to a portion of the coolant discharge passage farther from the welding gun than the second stop valve, and a pump unit connected to a second end of each of the first pipe, the second pipe, and the drain pipe to suck in the coolant from the first pipe and the second pipe and discharge the sucked coolant into the drain pipe.

A coolant drop prevention system according to a second aspect of the present invention is the coolant drop prevention system according to the first aspect of the present invention in which the pump unit includes a first connection tube connecting the second end of the first pipe and the second end of the drain pipe, a second connection tube connecting the second end of the second pipe and the second end of the drain pipe, a pair of first check valves in series at intermediate positions along the first connection tube to direct flow of the coolant inside the first connection tube from the first pipe toward the drain pipe, a pair of second check valves in series at intermediate positions along the second connection tube to direct flow of the coolant inside the second connection tube from the second pipe toward the drain pipe, a cylindrical body having a first end with a guide hole, a partition dividing an internal space of the cylindrical body into a first space being in a first direction along a centerline of the cylindrical body and a second space being in a second direction along the centerline of the cylindrical body, a guide rod slidably fitted through the guide hole and having a first end connected to the partition, a fluid pressure cylinder connected to a second end of the guide rod to slide the guide rod, a first suction-discharge tube having a first end connected to the first space and a second end connected to a portion of the first connection tube between the pair of first check valves, and a second suction-discharge tube having a first end connected to the second space and a second end connected to a portion of the second connection tube between the pair of second check valves.

Advantageous Effects

In the first aspect of the invention, the replacement for the electrodes involves operating the first and second stop valves to stop the circulation of the coolant into the electrodes. The pump unit is then activated. The coolant remaining in the portion of the coolant supply passage closer to the welding gun than the first stop valve is sucked into the pump unit through the first pipe. At the same time, the coolant remaining in the portion of the coolant discharge passage closer to the welding gun than the second stop valve is sucked into the pump unit through the second pipe. As the pump unit sucks a volume of the coolant, the sucked coolant returns to the portion of the coolant discharge passage farther from the welding gun than the second stop valve through the drain pipe. The second stop valve allows the coolant returning to the coolant discharge passage to be discharged directly, without the coolant moving toward the welding gun. The electrodes are thus removed from the tip of the welding gun while all the remaining coolant is being eliminated from the entire portion of the coolant supply passage closer to the welding gun than the first stop valve and all the remaining coolant is being eliminated from the entire portion of the coolant discharge passage closer to the welding gun than the second stop valve, independently of the type or the size of the welding gun. The coolant is thus reliably prevented from dropping from the tip of the welding gun during replacement of the electrodes, independently of the size or the type of the equipment.

In the second aspect of the invention, the fluid pressure cylinder is activated with the coolant remaining in the second space. When the guide rod slides in the first direction, the partition moves to increase the first space. The two first check valves allow the coolant in the portion of the coolant supply passage closer to the welding gun than the first stop valve to be sucked into the first space through the first pipe, the first connection tube, and the first suction-discharge tube. At the same time, the two second check valves allow the coolant remaining in the second space to be discharged into the portion of the coolant discharge passage farther from the welding gun than the second stop valve through the second suction-discharge tube, the second connection tube, and the drain pipe. The fluid pressure cylinder is activated with the coolant remaining in the first space. When the guide rod slides in the second direction, the partition moves to increase the second space. The two second check valves allow the coolant in the portion of the coolant discharge passage closer to the welding gun than the second stop valve to be sucked into the second space through the second pipe, the second connection tube, and the second suction-discharge tube. At the same time, the two first check valves allow the coolant remaining in the first space to be discharged into the portion of the coolant discharge passage farther from the welding gun than the second stop valve through the first suction-discharge tube, the first connection tube, and the drain pipe. Moving the partition back and forth inside the single cylindrical body in this manner allows the coolant in the coolant supply passage and the coolant in the coolant discharge passage to be sucked alternately, and also allows the sucked coolant to return to the coolant discharge passage. The coolant drop prevention system is thus efficient and inexpensive.

DETAILED DESCRIPTION

One or more embodiments of the present invention will now be described in detail with reference to the drawings. The embodiments described below are mere examples.

Figure 1:
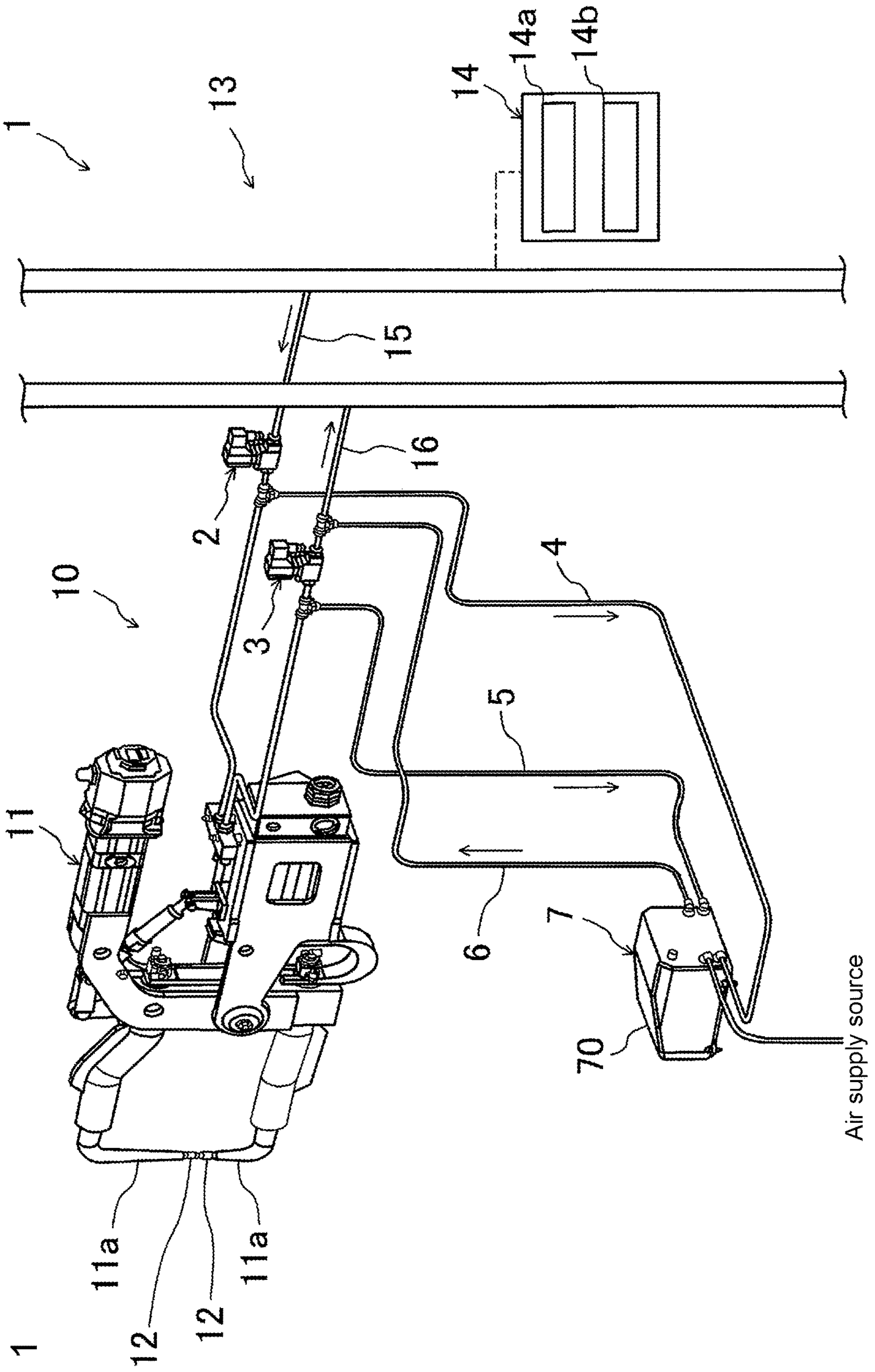
FIG. 1 is a schematic diagram of a coolant drop prevention system according to an embodiment of the present invention.

FIG. 1 shows a spot welder 10 connected to a coolant drop prevention system 1 according to an embodiment of the present invention. The spot welder 10 may be used to, for example, assemble multiple pressed components (not shown) with spot welding on an automotive production line. The spot welder 10 includes a welding gun 11 that is substantially C-shaped as viewed from the front.

The welding gun 11 includes, at its tip, a pair of thin rod shanks 11*a* that face each other. One shank 11*a* can move toward and away from the other shank 11*a*.

An electrode 12 is detachably attached to the tip of each shank 11*a*. The electrodes 12 are substantially bell-shaped as viewed from the front. In spot welding, a workpiece to be welded (not shown) is placed between the two electrodes 12. In this state, one shank 11*a* in the welding gun 11 is moved toward the other shank 11*a* to hold and apply a pressure to the workpiece between the two electrodes 12. An electric current is then supplied between the two electrodes 12.

The welding gun 11 is connected to a cooling unit 13 for cooling the two electrodes 12.

The cooling unit 13 includes a unit body 14, a coolant supply pipe 15 (coolant supply passage), and a coolant discharge pipe 16 (coolant discharge passage). The unit body 14 includes a pump 14*a* for circulating coolant and a tank 14*b* for storing the coolant. The coolant supply pipe 15 extends from the unit body 14 to each electrode 12. The coolant discharge pipe 16 extends from each electrode 12 to the unit body 14. The pump 14*a* is activated to start circulation of the coolant from the tank 14*b* into each electrode 12 through the coolant supply pipe 15 and the coolant discharge pipe 16. The circulated coolant cools each electrode 12.

The coolant drop prevention system 1 includes a first stop valve 2 and a second stop valve 3. The first stop valve 2 is at an intermediate position along the coolant supply pipe 15. The second stop valve 3 is at an intermediate position along the coolant discharge pipe 16. The first stop valve 2 can stop supply of the coolant into the electrodes 12. The second stop valve 3 can stop discharge of the coolant from the electrodes 12.

A first pipe 4 has a first end connected to a portion of the coolant supply pipe 15 closer to the welding gun 11 than the first stop valve 2.

A second pipe 5 has a first end connected to a portion of the coolant discharge pipe 16 closer to the welding gun 11 than the second stop valve 3. A drain pipe 6 has a first end connected to a portion of the coolant discharge pipe 16 farther from the welding gun 11 than the second stop valve 3.

A pump unit 7 is connected to a second end of each of the first pipe 4, the second pipe 5, and the drain pipe 6.

Figure 2:
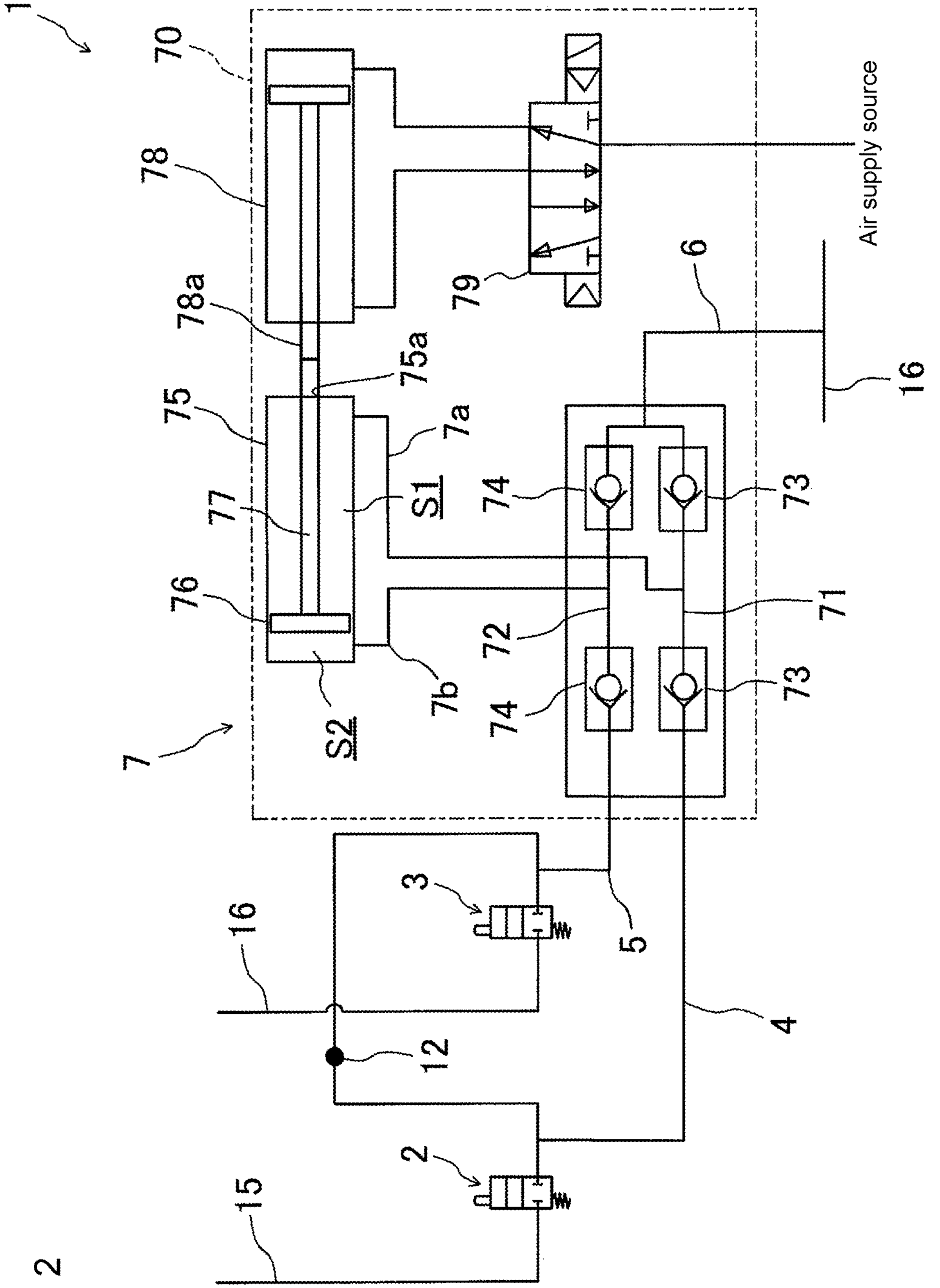
FIG. 2 is a schematic diagram of a pump unit in the embodiment of the present invention.

The pump unit 7 includes a rectangular body case 70. As shown in FIG. 2, the body case 70 encloses a first connection tube 71 and a second connection tube 72 routed in the body case 70. The first connection tube 71 connects the second end of the first pipe 4 and the second end of the drain pipe 6. The second connection tube 72 connects the second end of the second pipe 5 and the second end of the drain pipe 6.

A pair of first check valves 73 are at intermediate positions along the first connection tube 71. The first check valves 73 direct the flow of the coolant inside the first connection tube 71 from the first pipe 4 toward the drain pipe 6 and are arranged in series in the direction in which the coolant flows.

A pair of second check valves 74 are at intermediate positions along the second connection tube 72. The second check valves 74 direct the flow of the coolant inside the second connection tube 72 from the second pipe 5 toward the drain pipe 6 and are arranged in series in the direction in which the coolant flows.

The body case 70 also encloses a cylindrical body 75, a partition 76, and a guide rod 77. The cylindrical body 75 has a guide hole 75*a* at a first end. The partition 76 divides the internal space of the cylindrical body 75 into a first space S1 and a second space S2. The first space S1 is in a first direction along the centerline of the cylindrical body 75. The second space S2 is in a second direction along the centerline of the cylindrical body 75. The guide rod 77 is slidably fitted through the guide hole 75*a*. The guide rod 77 has its first end connected to the partition 76.

A double-acting air cylinder 78 is located in the first direction along the centerline of the cylindrical body 75. The air cylinder 78 is connected to an air supply source with a solenoid valve 79.

The air cylinder 78 includes a piston rod 78*a* aligned with the centerline of the cylindrical body 75 and connected to a second end of the guide rod 77. The piston rod 78*a* extends and retracts to slide the partition 76 and the guide rod 77 along the centerline of the cylindrical body 75.

A first suction-discharge tube 7*a* is routed between the first connection tube 71 and the cylindrical body 75. The first suction-discharge tube 7*a* has a first end connected to the first space S1 and a second end connected to a portion of the first connection tube 71 between the two first check valves 73. A second suction-discharge tube 7*b* is routed between the second connection tube 72 and the cylindrical body 75. The second suction-discharge tube 7*b* has a first end connected to the second space S2 and a second end connected to a portion of the second connection tube 72 between the two second check valves 74.

The operation of the coolant drop prevention system 1 according to the embodiment of the present invention will now be described in detail.

In the replacement of the electrodes 12 in the welding gun 11 described above, the coolant drop prevention system 1 is turned on. A controller (not shown) activates the first stop valve 2 and the second stop valve 3 to stop the circulation of the coolant into the electrodes 12. The controller then activates the pump unit 7 to actuate the air cylinder 78. When the piston rod 78*a* in the air cylinder 78 extends, the guide rod 77 slides in the first direction. The partition 76 then moves with the guide rod 77 to increase the first space S1 and decrease the second space S2. The two first check valves 73 allow the coolant in the portion of the coolant supply pipe 15 closer to the welding gun 11 than the first stop valve 2 to be sucked into the first space S1 through the first pipe 4, the first connection tube 71, and the first suction-discharge tube 7*a*.

When the piston rod 78*a* in the air cylinder 78 retracts, with the coolant remaining in the first space S1, the guide rod 77 slides in the second direction. The partition 76 then moves with the guide rod 77 to increase the second space S2 and decrease the first space S1. The two second check valves 74 allow the coolant in the portion of the coolant discharge pipe 16 closer to the welding gun 11 than the second stop valve 3 to be sucked into the second space S2 through the second pipe 5, the second connection tube 72, and the second suction-discharge tube 7*b*. At the same time, the two first check valves 73 allow the coolant remaining in the first space S1 to be discharged into the portion of the coolant discharge pipe 16 farther from the welding gun 11 than the second stop valve 3 through the first suction-discharge tube 7*a*, the first connection tube 71, and the drain pipe 6.

When the piston rod 78*a* in the air cylinder 78 extends, with the coolant remaining in the second space S2, the guide rod 77 slides in the first direction. The partition 76 then moves with the guide rod 77 to increase the first space S1 and decrease the second space S2. The two first check valves 73 allow the coolant in the portion of the coolant supply pipe 15 closer to the welding gun 11 than the first stop valve 2 to be sucked into the first space S1 through the first pipe 4, the first connection tube 71, and the first suction-discharge tube 7*a*. At the same time, the two second check valves 74 allow the coolant remaining in the second space S2 to be discharged into the portion of the coolant discharge pipe 16 farther from the welding gun 11 than the second stop valve 3 through the second suction-discharge tube 7*b*, the second connection tube 72, and the drain pipe 6.

In this manner, the pump unit 7 sucks in the coolant from the first pipe 4 and the second pipe 5 and discharges the sucked coolant into the drain pipe 6.

As described above, the coolant drop prevention system 1 according to the embodiment of the present invention has the structure described below. The coolant remaining in the portion of the coolant supply pipe 15 closer to the welding gun 11 than the first stop valve 2 is sucked into the pump unit 7 through the first pipe 4. At the same time, the coolant remaining in the portion of the coolant discharge pipe 16 closer to the welding gun 11 than the second stop valve 3 is sucked into the pump unit 7 through the second pipe 5. As the pump unit 7 sucks a volume of the coolant, the sucked coolant returns to the portion of the coolant discharge pipe 16 farther from the welding gun 11 than the second stop valve 3 through the drain pipe 6. The second stop valve 3 allows the coolant returning to the coolant discharge pipe 16 to be discharged directly, without the coolant moving toward the welding gun 11. The electrodes 12 are thus removed from the tip of the welding gun 11 while all the remaining coolant is being eliminated from the entire portion of the coolant supply pipe 15 closer to the welding gun 11 than the first stop valve 2 and all the remaining coolant is being eliminated from the entire portion of the coolant discharge pipe 16 closer to the welding gun 11 than the second stop valve 3, independently of the type or the size of the welding gun 11. The coolant is thus reliably prevented from dropping from the tip of the welding gun 11 during replacement of the electrodes 12, independently of the size or the type of the equipment. Further, moving the partition 76 back and forth inside the single cylindrical body 75 in this manner allows the coolant in the coolant supply pipe 15 and the coolant in the coolant discharge pipe 16 to be sucked alternately, and also allows the sucked coolant to return to the coolant discharge pipe 16. The coolant drop prevention system 1 is thus efficient and inexpensive.

In the above embodiment of the present invention, the pump unit 7 sucks in the coolant in the coolant supply pipe 15 and the coolant discharge pipe 16 by moving the partition 76 back and forth inside the cylindrical body 75. However, any other type of pump unit may be used to suck in the coolant from the first pipe 4 and the second pipe 5 and discharge the sucked coolant into the drain pipe 6.

In the above embodiment of the present invention, the fluid pressure cylinder in the pump unit 7 is the air cylinder 78. However, another type of fluid pressure cylinder may be used.

INDUSTRIAL APPLICABILITY

One or more embodiments of the present invention may be implemented as a coolant drop prevention system to be connected to a spot welder. When electrodes at the tip of a welding gun in the spot welder are removed for replacement, the coolant drop prevention system prevents coolant for the electrodes from dropping from the tip of the welding gun.

REFERENCE SIGNS LIST

1 coolant drop prevention system
2 first stop valve
3 second stop valve
4 first pipe
5 second pipe
6 drain pipe
7 pump unit
7*a* first suction-discharge tube
7*b* second suction-discharge tube
10 spot welder
11 welding gun
11*a* shank
12 electrode
15 coolant supply pipe (coolant supply passage)
16 coolant discharge pipe (coolant discharge passage)
71 first connection tube
72 second connection tube
73 first check valve
74 second check valve
75 cylindrical body
75*a* guide hole
76 partition
77 guide rod
78 air cylinder (fluid pressure cylinder)
S1 first space
S2 second space

The invention claimed is:

1. A coolant drop prevention system for preventing, when electrodes are removed from a tip of a welding gun in a spot welder, coolant, circulated into the electrodes through a coolant supply passage and a coolant discharge passage, from dropping from the tip of the welding gun, the coolant drop prevention system comprising:

a first stop valve at an intermediate position along the coolant supply passage to stop supply of the coolant into the electrodes;

a second stop valve at an intermediate position along the coolant discharge passage to stop discharge of the coolant from the electrodes;

a first pipe having a first end connected to a portion of the coolant supply passage closer to the welding gun than the first stop valve;

a second pipe having a first end connected to a portion of the coolant discharge passage closer to the welding gun than the second stop valve;

a drain pipe having a first end connected to a portion of the coolant discharge passage farther from the welding gun than the second stop valve; and a pump unit connected to a second end of each of the first pipe, the second pipe, and the drain pipe to suck in the coolant from the first pipe and the second pipe and discharge the sucked coolant into the drain pipe, wherein the pump unit includes a first connection tube connecting the second end of the first pipe and the second end of the drain pipe, a second connection tube connecting the second end of the second pipe and the second end of the drain pipe, a pair of first check valves in series at intermediate positions along the first connection tube to direct flow of the coolant inside the first connection tube from the first pipe toward the drain pipe, a pair of second check valves in series at intermediate positions along the second connection tube to direct flow of the coolant inside the second connection tube from the second pipe toward the drain pipe, a cylindrical body having a first end with a guide hole, a partition dividing an internal space of the cylindrical body into a first space being in a first direction along a centerline of the cylindrical body and a second space being in a second direction along the centerline of the cylindrical body, a guide rod slidably fitted through the guide hole and having a first end connected to the partition, a fluid pressure cylinder connected to a second end of the guide rod to slide the guide rod, a first suction-discharge tube having a first end connected to the first space and a second end connected to a portion of the first connection tube between the pair of first check valves, and a second suction-discharge tube having a first end connected to the second space and a second end connected to a portion of the second connection tube between the pair of second check valves.

* * * * *